(12) United States Patent
Kuhn

(10) Patent No.: US 8,326,256 B1
(45) Date of Patent: *Dec. 4, 2012

(54) RFID TAG WITH MOS BIPOLAR HYBRID RECTIFIER

(75) Inventor: Jay A. Kuhn, Seattle, WA (US)

(73) Assignee: Impinj, Inc., Seattle, WA (US)

(*) Notice: Subject to any disclaimer, the term of this patent is extended or adjusted under 35 U.S.C. 154(b) by 1162 days.

This patent is subject to a terminal disclaimer.

(21) Appl. No.: 12/173,718

(22) Filed: Jul. 15, 2008

(51) Int. Cl.
*H04B 1/16* (2006.01)
(52) U.S. Cl. .................. 455/343.3; 340/572.1; 327/536
(58) Field of Classification Search ............. 455/343.3; 340/572.1–572.7; 327/536
See application file for complete search history.

(56) References Cited

U.S. PATENT DOCUMENTS

| | | | |
|---|---|---|---|
| 2,986,652 A | 5/1961 | Eachus | |
| 3,479,529 A | 11/1969 | Dine | |
| 3,551,705 A | 12/1970 | Juliusburger | |
| 4,032,838 A | 6/1977 | Minami et al. | |
| 5,606,323 A | 2/1997 | Heinrich et al. | |
| 5,630,216 A | 5/1997 | McEwan | |
| 5,659,502 A | 8/1997 | Sali et al. | |
| 5,936,454 A | 8/1999 | Joardar | |
| 6,023,188 A | 2/2000 | Lee et al. | |
| 6,032,188 A | 2/2000 | Lee et al. | |
| 6,040,773 A | 3/2000 | Vega et al. | |
| 6,147,605 A | 11/2000 | Vega et al. | |
| 6,154,014 A | 11/2000 | Suu | |
| 6,252,508 B1 | 6/2001 | Vega et al. | |
| 6,297,974 B1 | 10/2001 | Ganesan et al. | |
| 6,320,230 B1 | 11/2001 | Yu | |
| 6,496,112 B1 | 12/2002 | Vega | |
| 6,753,704 B2 | 6/2004 | Desgrez et al. | |
| 6,859,058 B2 | 2/2005 | Watanabe et al. | |
| 6,937,514 B2 | 8/2005 | Hasegawa | |
| 6,946,950 B1 | 9/2005 | Ueno et al. | |
| 7,046,071 B1 | 5/2006 | Conn et al. | |
| 7,167,090 B1 | 1/2007 | Mandal et al. | |
| 7,276,958 B2* | 10/2007 | Miyamitsu et al. | 327/536 |
| 7,570,034 B2 | 8/2009 | Nitta et al. | |
| 7,853,236 B2 | 12/2010 | Ootaka et al. | |
| 7,969,235 B2* | 6/2011 | Pan | 327/537 |
| 2002/0008989 A1 | 1/2002 | Honigschmid | |
| 2002/0196070 A1* | 12/2002 | Miyamitsu | 327/536 |
| 2003/0132784 A1 | 7/2003 | Desgrez et al. | |
| 2004/0212008 A1 | 10/2004 | Hasegawa | |

(Continued)

FOREIGN PATENT DOCUMENTS

JP 11032476 A * 2/1999

OTHER PUBLICATIONS

Final Office Action, U.S. Appl. No. 12/042,117, mailed Aug. 18, 2011.

(Continued)

*Primary Examiner* — Quan Tra
(74) *Attorney, Agent, or Firm* — Turk IP Law, LLC

(57) ABSTRACT

The present disclosure provides a power rectifier for a Radio Frequency Identification tag circuit. The power rectifier is constructed from a pair of hybrid RF rectifier elements that include a MOS transistor. Gates of the transistors have predetermined voltages applied to them. The applied voltages bias the transistors to near their active operating regions, while an additional RF control signal is being applied to the gates of the transistors.

23 Claims, 15 Drawing Sheets

U.S. PATENT DOCUMENTS

| | | |
|---|---|---|
| 2004/0257899 A1 | 12/2004 | Lee et al. |
| 2005/0093614 A1* | 5/2005 | Lee .............................. 327/536 |
| 2005/0162145 A1* | 7/2005 | Smith et al. ................... 323/312 |
| 2006/0104134 A1 | 5/2006 | Kim et al. |
| 2007/0128760 A1 | 6/2007 | Subramanian et al. |
| 2007/0210776 A1 | 9/2007 | Oka |
| 2008/0001094 A1 | 1/2008 | Korthout et al. |
| 2008/0158926 A1 | 7/2008 | Umeda et al. |
| 2009/0195289 A1 | 8/2009 | Subramanian et al. |
| 2010/0148845 A1 | 6/2010 | Kato |
| 2010/0245212 A1 | 9/2010 | Dallas et al. |

OTHER PUBLICATIONS

Non-Final Office Action U.S. Appl. No. 12/042,117 mailed Apr. 12, 2011.

* cited by examiner

*RFID TAG COMPONENTS*

*HYBRID RECTIFIER AS PART OF POWER MANAGEMENT UNIT*

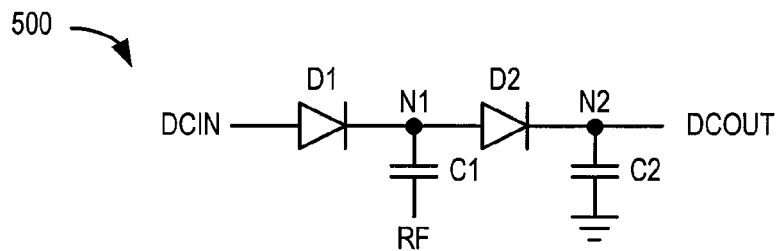
FIG. 5 (PRIOR ART)  *DICKSON RF "CHARGE PUMP" STAGE*
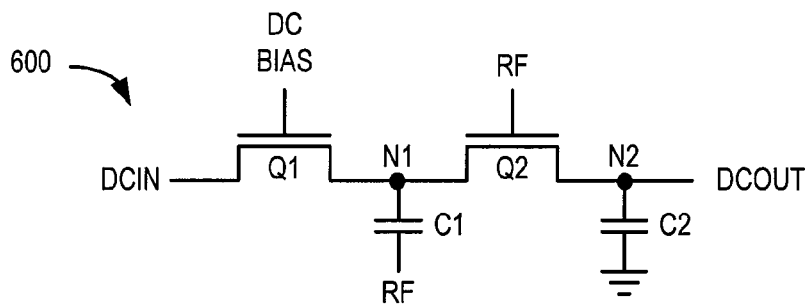
FIG. 6 (PRIOR ART)  *NMOS RF RECTIFIER STAGE*
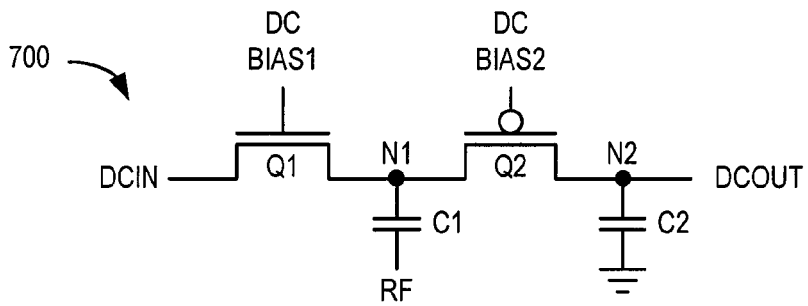
FIG. 7 (PRIOR ART)  *CMOS RF RECTIFIER STAGE*

FROM US 7167090

POWER RECTIFIER FOR RFID TAG
WITH HYBRID STAGE

POWER RECTIFIER FOR RFID TAG
WITH HYBRID STAGE

NEGATIVE HYBRID RF RECTIFIER STAGE

DUAL HYBRID RECTIFIER STAGE

NOTATIONS USED FOR ANALYSIS
OF RECTIFIER CIRCUITS

*IDEAL RECTIFIER ELEMENT*

*SIMPLE DIODE-CONNECTED TRANSISTOR*

*MOS RECTIFIER ELEMENT WITH BIAS*

*HYBRID RECTIFIER ELEMENT*

RFID TAG WITH MOS BIPOLAR HYBRID RECTIFIER

CROSS-REFERENCE TO RELATED APPLICATION(S)

This patent application may be found to be pertinent to commonly owned U.S. patent application Ser. No. 12/042,141, filed on Mar. 4, 2008, and entitled "RFID TAG WITH DOUBLE-SWITCH RECTIFIER".

This patent application may be found to be pertinent to commonly owned U.S. patent application Ser. No. 12/042,117, filed on Mar. 4, 2008, and entitled "RFID TAGS WITH SYNCHRONOUS POWER RECTIFIER".

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Harvesting sufficient power from the RF wave can be difficult since the voltage of the RF signal is in the range of approximately 200 mV, and a typical supply voltage for circuits of the RFID tag is 1 V. Available RF signal amplitude is insufficient to operate the RFID tag, therefore power rectifier circuits typically use charge-pumps to increase the output DC voltage.

Additionally, for relatively high-voltage operations, such as programming and erasing non-volatile memory in the RFID tag, a boosted voltage as high as 12 V may be needed. Complicating matters is that the RF wave received by the RFID tag is not provided constantly, and can cease to be transmitted by the RFID reader without any notice. Additionally when the RFID tag backscatters it stops harvesting energy, causing yet another interruption in voltage generation.

Thus, the operation of the passive RFID tag, converting the low-level RF waveform to a usable voltage, requires a rectifier circuit that can maximize the use of available radiation energy, and generate usable voltage quickly and efficiently.

BRIEF DESCRIPTION OF THE DRAWINGS

The following Detailed Description proceeds with reference to the accompanying Drawings.

FIG. 5 is a schematic diagram of a conventional Dickson RF "Charge-pump" Stage according to prior art.

FIG. 6 is a schematic diagram of a conventional NMOS RF Rectifier Stage according to prior art.

FIG. 7 is a schematic diagram of a conventional CMOS RF Rectifier Stage according to prior art.

DETAILED DESCRIPTION

Figure 1:
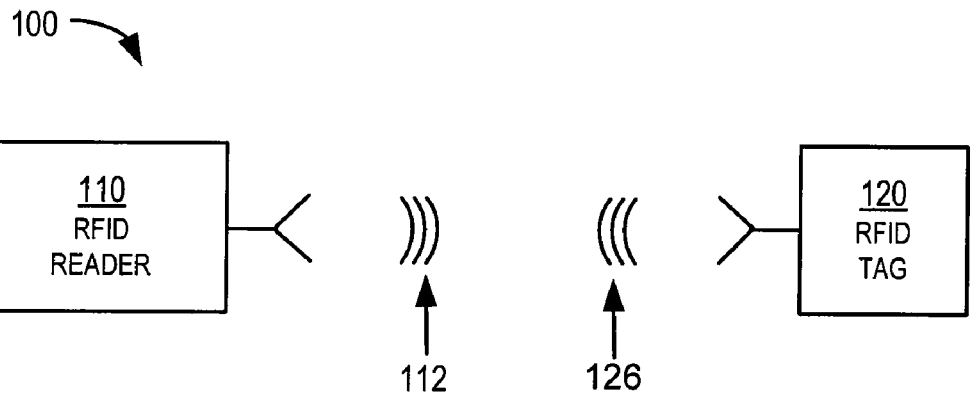
FIG. 1 is a block diagram of an RFID system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention might be modified in numerous ways. Among other things, the present invention may be embodied as devices, methods, and so on. Accordingly, the present invention may take the form of an entirely device embodiment, an entirely method embodiment, or an embodiment combining aspects of the above. This description is therefore, not to be taken in a limiting sense.

FIG. 1 is a diagram of components of a typical RFID system 100, incorporating aspects of the invention. RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented ultimately for exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
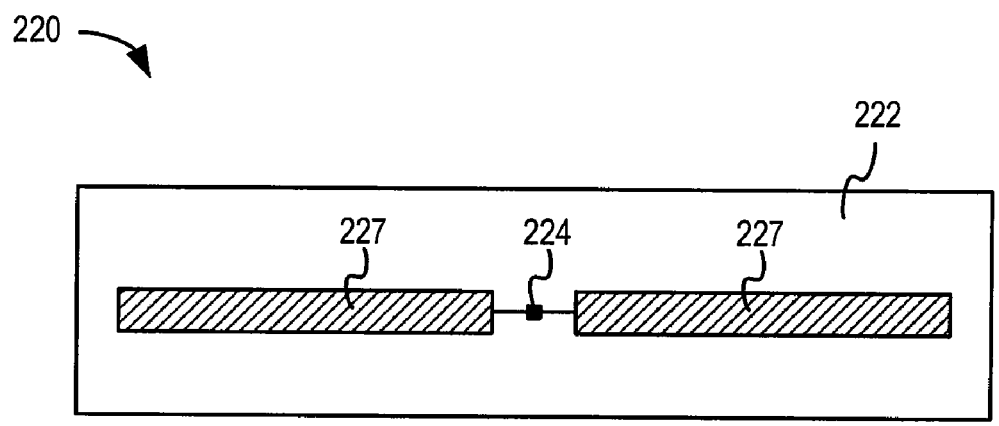
FIG. 2 is a diagram showing components of a passive RFID tag.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags. Tag 220 is formed on substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227s, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on. The components of the RFID system of FIG. 1 may communicate with each other in any number of modes.

Figure 3:
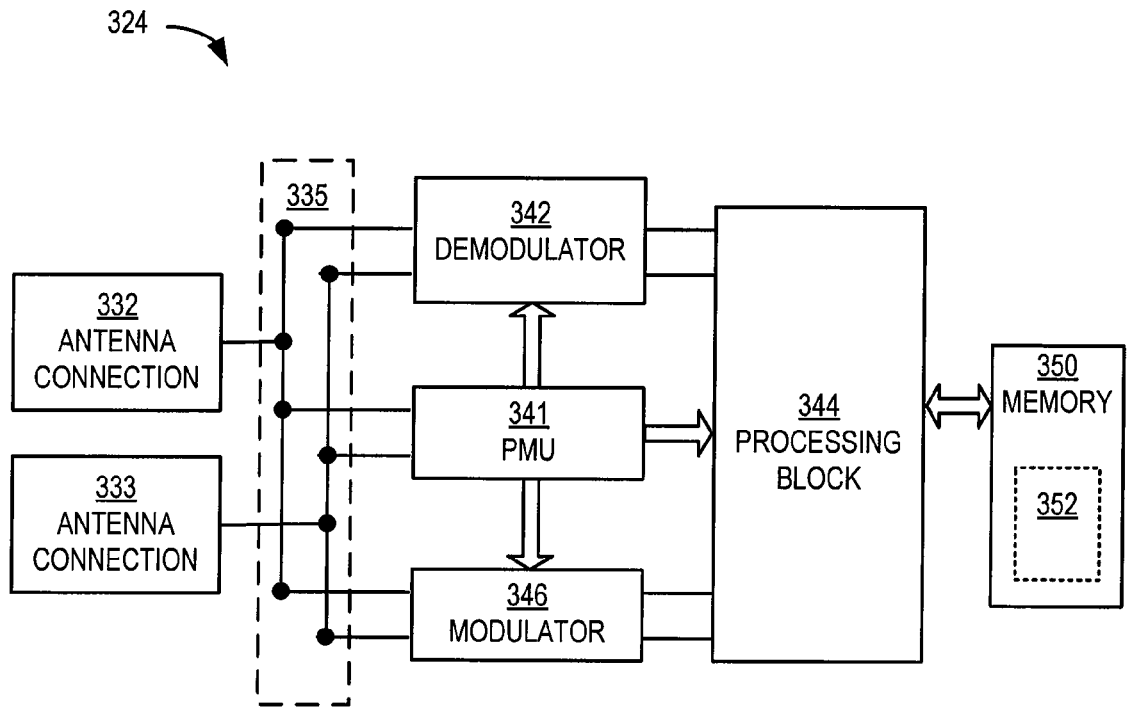
FIG. 3 is a block diagram of an implementation of an electrical circuit formed in an IC of the tag of FIG. 2.

FIG. 3 is a block diagram of an electrical circuit 324. Circuit 324 may be formed on a semiconductor substrate in an IC of an RFID tag, such as IC 224 of FIG. 2. Circuit 324 has a number of main components that are described in this document. Circuit 324 may have a number of additional or different components, from what is shown and described, depending on the exact implementation.

Circuit 324 includes at least two antenna connections 332 and 333, which are suitable for coupling to one or more antenna segments (not shown in FIG. 3). Antenna connections 332 and 333 may be made in any suitable way, such as pads and so on. In a number of embodiments, more than two antenna connections are used, especially in embodiments where more antenna segments are used.

Circuit 324 includes a section 335. Section 335 may be implemented as shown, for example, as a group of nodes for proper routing of signals. In some embodiments, section 335 may be implemented other ways, for example a receive/transmit switch can be included to route a signal, and so on.

Circuit 324 also includes Power Management Unit (PMU) 341. PMU 341 may be implemented in any way known in the art, for harvesting raw RF power received via antenna connections 332, 333. In some embodiments, PMU 341 includes at least one rectifier, and so on.

In operation, an RF wave received via antenna connections 332, 333 is received by PMU 341, which in turn generates power for components of circuit 324.

Circuit 324 additionally includes a demodulator 342. Demodulator 342 demodulates an RF signal received via antenna connections 332, 333. Demodulator 342 may be implemented in any way known in the art, for example including an attenuator stage, an amplifier stage, and so on.

Circuit 324 further includes processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, memory, a decoder, an encoder, and so on.

Circuit 324 additionally includes a modulator 346. Modulator 346 modulates an output signal generated by processing block 344. The modulated signal is transmitted by driving antenna connections 332, 333, and therefore driving the load presented by the coupled antenna segment or segments. Modulator 346 may be implemented in any way known in the art, for example including a driver stage, an amplifier stage, and so on. In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Circuit 324 additionally includes memory 350, which stores data 352. Memory 350 is preferably implemented as a Nonvolatile Memory (NVM), which means that data 352 is retained even when circuit 324 does not have power, as it is frequently the case for a passive RFID tag.

It will be recognized at this juncture that the shown components of circuit 324 can be those of a circuit of an RFID reader according to the invention, with or without needing PMU 341. Indeed, an RFID reader can be powered differently, such as from a wall outlet, a battery, and so on. Additionally, when circuit 324 is configured as a reader, processing block 344 may have additional Inputs/Outputs (I/O) to a terminal, network, or other such devices or connections.

Figure 4:
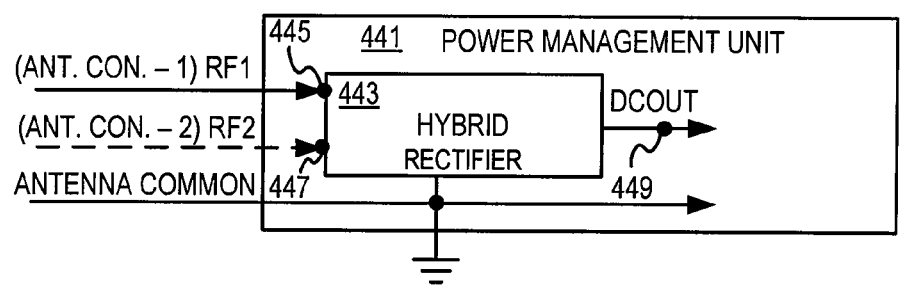
FIG. 4 is a block diagram illustrating components of a Power Management Unit of the circuit of FIG. 3.

FIG. 4 is block diagram 400 that illustrates a component of Power Management Unit 341 of the circuit of FIG. 3. Power Management Unit 441 includes at least one Hybrid rectifier 443. Hybrid rectifier 443 is coupled to a terminal of an antenna (not shown) at input node 445 to receive RF signal RF1, and optionally it may be coupled to a terminal of another antenna (not shown) at input node 447 to receive another RF signal RF2, detected by the antennas. Hybrid rectifier 443 converts induced alternating current ("AC") voltage captured by the antenna segments into usable DC voltage DCOUT 449. The DC voltage can be used to power operations of RFID tag 220 of FIG. 2.

FIG. 5 illustrates Dickson RF charge-pump stage 500. Charge-pump stage 500 includes two diodes D1 and D2 that are coupled in series at node N1. Capacitor C1 is connected to node N1 to receive an RF input signal. Capacitor C2 is connected between a ground and output terminal DCOUT. During a negative half of its AC cycle, the RF input signal forward biases diode D1 and charges capacitor C1. At this time, voltage V1 at node N1 is equal to DCIN−VT1, where VT1 is a threshold voltage of diode D1. During a positive half of its AC cycle, the RF input signal reverse biases diode D1 and forward biases diode D2. At this time voltage V1 at node N1 is equal to DCIN−VT1+2*VA, where a value of the RF input signal is given by VA*sin(ωt). Because diode D2 is forward biased, it transfers charge from capacitor C1 to capacitor C2, and voltage V2 at node DCOUT is equal to DCIN−VT1+2*VA−VT2, where VT2 is a threshold voltage.

FIG. 6 is a schematic diagram of a conventional NMOS RF rectifier stage 600. Rectifier stage 600 includes two NMOS switching transistors Q1 and Q2 that are coupled in series at node N1. Capacitor C1 is connected between N1 and an RF input signal. Capacitor C2 is connected between a ground and output terminal DCOUT.

When a gate bias voltage of transistor Q1 is greater than DCIN+VT1, where VT1 is the threshold voltage of transistor Q1, and the RF input signal is in the negative half of its AC cycle, transistor Q1 turns ON, and voltage V1 at node N1 is equal to DCIN. During this time, transistor Q2 is OFF. When the voltage level of the RF input signal increases from −VA to +VA, transistor Q1 turns OFF and transistor Q2 is turned ON. While transistor Q2 is ON, it transfers charge from capacitor C1 to capacitor C2, and the voltage level V2 at node DCOUT is equal to DCIN+2*VA.

FIG. 7 is a schematic diagram of a conventional CMOS RF rectifier stage 700. Rectifier stage 700 includes a pair of CMOS switching transistors Q1 and Q2. Voltage biases are coupled to gates of transistors Q1 and Q2 to provide bias voltages thereto. NMOS Q1 and PMOS Q2 are coupled in series at node N1. Capacitor C1 is connected between node N1 and RF antenna input node 733. Capacitor C2 is connected between ground and output terminal DCOUT.

When a gate bias voltage of NMOS Q1 is greater than or equal to DCIN+VT1, where VT1 is a threshold voltage of transistor Q1, and the RF1 input signal is in the negative half of its AC cycle, NMOS Q1 turns ON and voltage V1 at node N1 is equal to DCIN. During this time, PMOS Q2 is OFF. When the voltage level of the RF input signal increases from −VA to +VA, NMOS Q1 turns OFF and PMOS Q2 is turned ON. While PMOS Q2 is ON, it transfers charge from capacitor C1 to capacitor C2, and the voltage level V2 at node DCOUT is equal to DCIN+2*VA.

Figure 8:
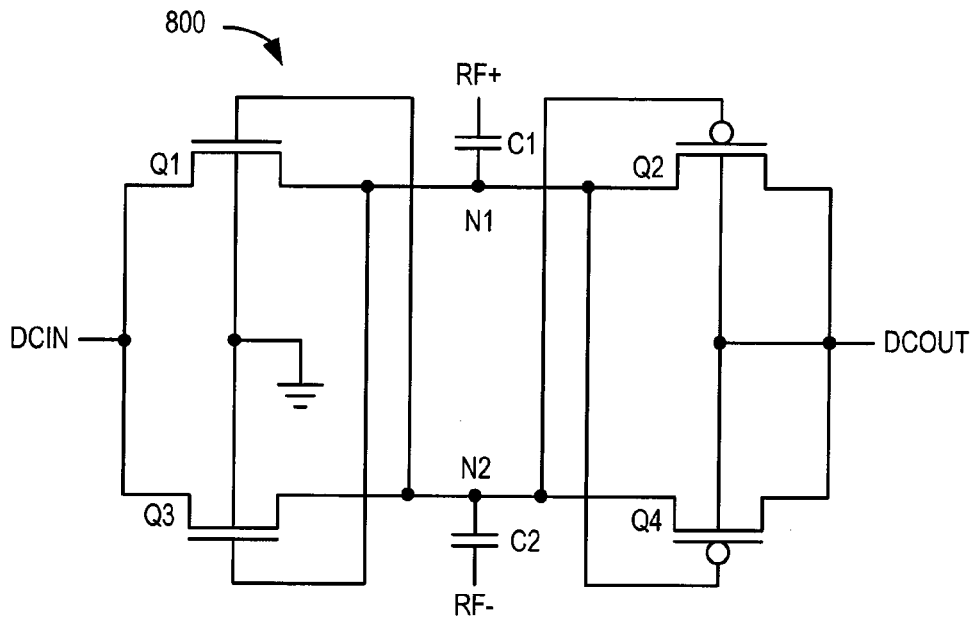
FIG. 8 is a schematic diagram of a single charge-pump cell according to prior art.

FIG. 8 shows a single charge-pump cell 800 using cross-coupled charge transfer switches. Differential RF input voltages RF+ and RF− are used to pump charge through pump capacitors C1 and C2 respectively, thus making DCOUT greater than DCIN.

The circuit works as follows. The RF+ input is given by +0.5*VA*sin(ωt), and the RF− input is given by −0.5*VA*sin(ωt). When RF− is high and RF+ is low, transistors Q1 and Q4 are turned ON, while the other two transistors Q2 and Q3 are turned off. Pump capacitor C2 is connected to RF−, and voltage V2 at node N2 is equal to DCIN+VA. Current flows through transistor Q4 from node N2, charging up the output towards DCIN+VA. At the same time, transistor Q1 charges pump capacitor C1 that is connected to RF+, and voltage V1 at node N1 is equal to DCIN. The whole procedure is repeated during the opposite phase, when the RF input polarities are reversed. During this phase, transistor Q1 and transistor Q3 turn ON, the other two transistors Q1 and Q4 turn OFF and the output is again charged towards DCIN+VA.

Figure 9:
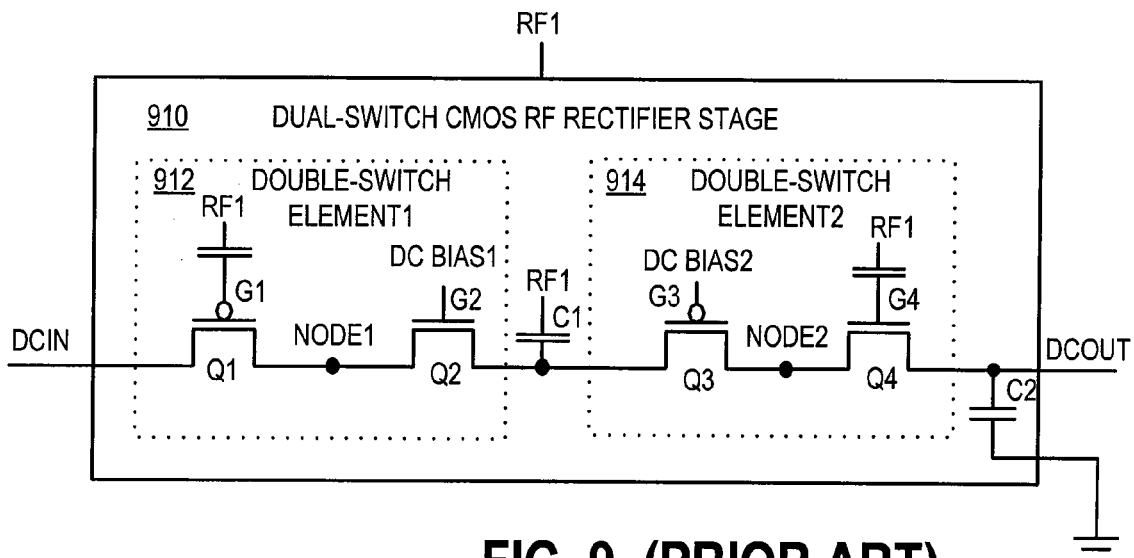
FIG. 9 is a schematic diagram of a Double-Switch CMOS RF Rectifier Stage according to prior art.

FIG. 9 is a schematic diagram of Double-Switch CMOS RF Rectifier Stage 910 according to prior art. Rectifier Stage 910 is designed to provide a positive output voltage DCOUT. Rectifier Stage 910 includes Double-Switch element1 912 and Double-Switch element2 914. Double-Switch element1 912 and Double-Switch element2 914 are coupled serially to form rectifier Stage 910. Capacitor C2 couples an output terminal of Double-Switch element2 914 to ground.

Double-Switch element1 912 includes PMOS transistor Q1 and NMOS transistor Q2. An input terminal of transistor Q2 is coupled to an output terminal of transistor Q1 to form intermediate node Node 1. Node 1 is not connected to any remaining components of its stage. Gate G1 of transistor Q1 and the output terminal of transistor Q1 are both coupled to an antenna input node, to receive RF1. Gate G1 may also be coupled to receive a DC bias voltage in addition to RF 1. Gate G2 of transistor Q1 is coupled to receive a DC bias voltage DC BIAS1, while the input terminal of transistor Q1 is coupled to receive a DC voltage.

Double-Switch element2 914 includes PMOS transistor Q3 and NMOS Q4. An input terminal of transistor Q4 is coupled to an output terminal of transistor Q3 to form intermediate node Node2. Node2 is not connected to any remaining components of its stage. Gate G3 of transistor Q3 is coupled to receive a DC bias voltage DC BIAS2, while the output terminal of transistor Q4 is coupled to receive a DC voltage. DC BIAS1 could be the same as, or different from, DC BIAS2. Gate G4 of transistor Q4 and the input terminal of transistor Q3 are both coupled to an antenna node, to receive RF 1. Gate G4 may also be coupled to receive a DC bias voltage in addition to RF1.

Figure 10A:
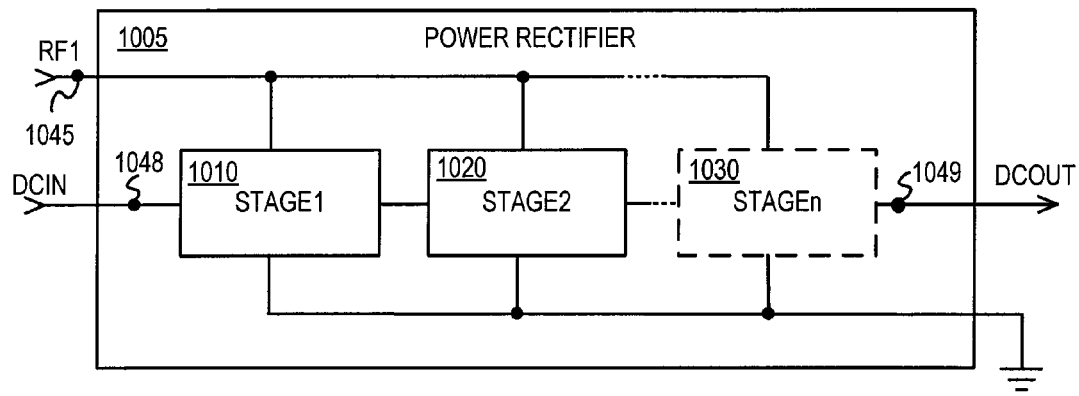
FIG. 10A is a block diagram illustrating a power rectifier using hybrid stages in the Power Management Unit of FIG. 4 according to an embodiment.

FIG. 10A is a block diagram that illustrates Hybrid Power Rectifier 1005 for the RFID tag. Power Rectifier 1005 includes, antenna input node 1045, that is configured to receive alternating RF signal RF 1 wirelessly, and a number of serially coupled rectifier stages. They are Rectifier Stage1 1010 through Rectifier StageN 1030. Rectifier Stage1 1010 through Rectifier StageN 1030 are coupled to ground and also coupled to receive signal RF1. Input node 1448 of Rectifier Stage1 1010 is connected to receive DC input DCIN, and output node 1049 of Rectifier StageN 1030 provides DC output DCOUT.

Figure 10B:
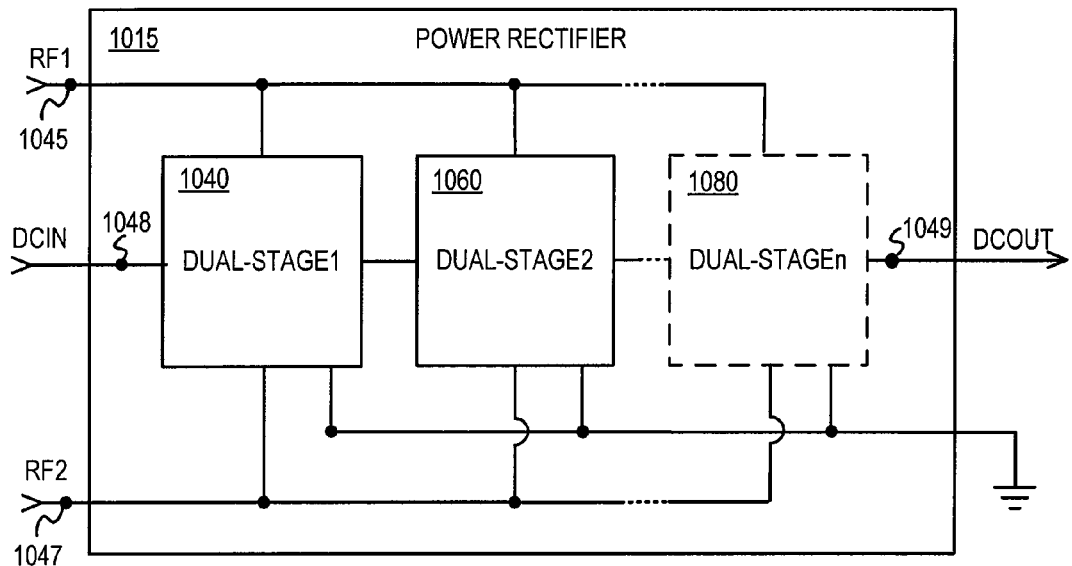
FIG. 10B is a block diagram illustrating a power rectifier using dual hybrid stages in the Power Management Unit of FIG. 4 according to an embodiment.

FIG. 10B is a block diagram that illustrates Power Rectifier 1015 for an RFID tag. Power Rectifier 1015 includes, antenna input nodes 1045 and 1047, that are configured to receive wirelessly alternating RF signals RF 1 and RF2 respectively, and a number of serially coupled dual Hybrid rectifier stages, Rectifier Stage1 1040 through Rectifier StageN 1080. Rectifier Stage1 1040 through Rectifier StageN 1080 are coupled to ground and also coupled to receive both RF signals, RF1 and RF2. Input node 1448 of Rectifier Stage1 1040 is connected is to receive DC input DCIN, and output node 1049 of Rectifier StageN 1030 provides DC output DCOUT.

A Power Rectifier having two antenna ports, as shown in FIG. 10B, may be useful in applications requiring more than one antenna to improve tag orientation insensitivity, or in applications requiring more than a single type of antenna, such as a far field antenna and a near field antenna, etc. It is evident that the Power Rectifier may also be designed to have more than two antenna ports.

FIGS. 11A, 11B, 12A, and 12B are schematic diagrams that illustrate different aspects of Rectifier Stage 1110A and its constituting elements according to embodiments. Rectifier Stage 1110A is designed to provide a positive output voltage DCOUT. Rectifier Stage 1110A includes Hybrid element1 1112A and Hybrid element2 1114. Hybrid element1 1112A and Hybrid element2 1114 are coupled serially to form rectifier Stage 1110A. Capacitor C2 couples an output terminal of Hybrid element2 1114 to ground.

Hybrid element1 1112A includes PMOS transistor Q1 and first device 51. An input terminal of first device S1 is coupled to an output terminal of transistor Q1 to form intermediate node Node 1. Node 1 is not connected to any remaining components of its stage. Gate G1 of transistor Q1 and an output terminal of device S1 are both coupled to antenna input node 1145, to receive RF1. Gate G1 may also be coupled to receive a DC bias voltage in addition to RF1, while the input terminal of transistor Q1, that is also an input terminal of rectifier stage 1110B, is coupled to receive a DC voltage.

Hybrid element1 1112B includes PMOS transistor Q1 and Schottky diode D1. An anode of Schottky diode D1 is coupled to an output terminal of transistor Q1 to form intermediate node Node 1. Node 1 is not connected to any remaining components of its stage. Gate G1 of transistor Q1 and a cathode of Schottky diode D1 are both coupled to antenna input node 1145, to receive RF1. Gate G1 may also be coupled to receive a DC bias voltage in addition to RF1, while the input terminal of transistor Q1, that is also an input terminal of rectifier stage 1110B, is coupled to receive a DC voltage.

Hybrid element2 1114 includes Schottky diode D2 and NMOS Q2. An input terminal of transistor Q2 is coupled to a cathode of Schottky diode D2 to form intermediate node Node2. Node2 is not connected to any remaining components of its stage. Gate G2 of transistor Q2 and an anode of Schottky diode D2 are both coupled to antenna node 1145, to receive RF1. Gate G2 may also be coupled to receive a DC bias voltage in addition to RF 1. An output terminal of transistor Q2 is the output terminal of rectifier stage 1110B.

The applied DC bias voltages are functions of amplitude of the RF signals and may be controlled such that the DC output current of the Power Rectifier is substantially maximized for a given RF input power.

Figure 11A:
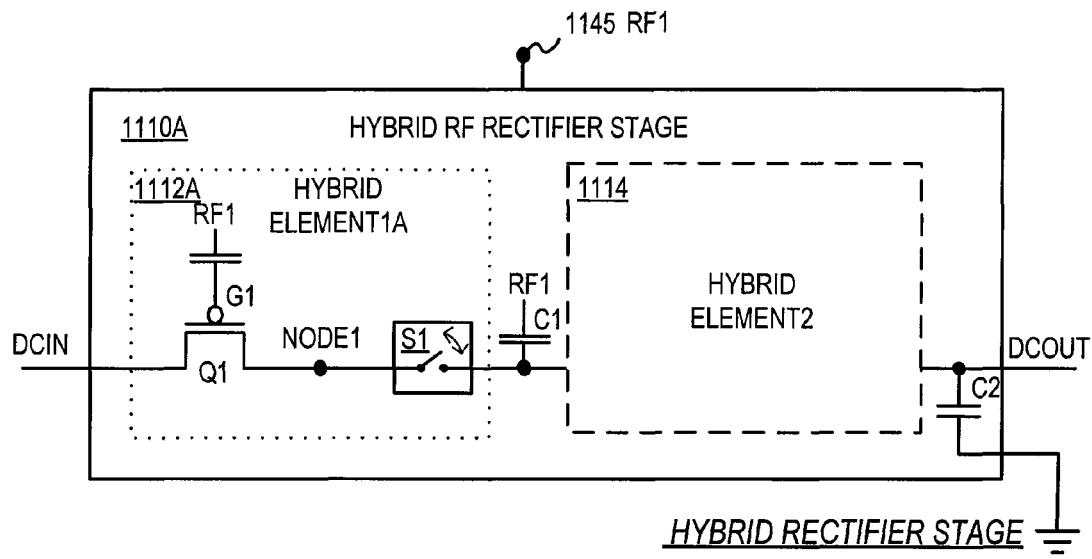
FIG. 11A is a simplified schematic diagram of a hybrid RF Rectifier Stage according to embodiments.
Figure 11B:
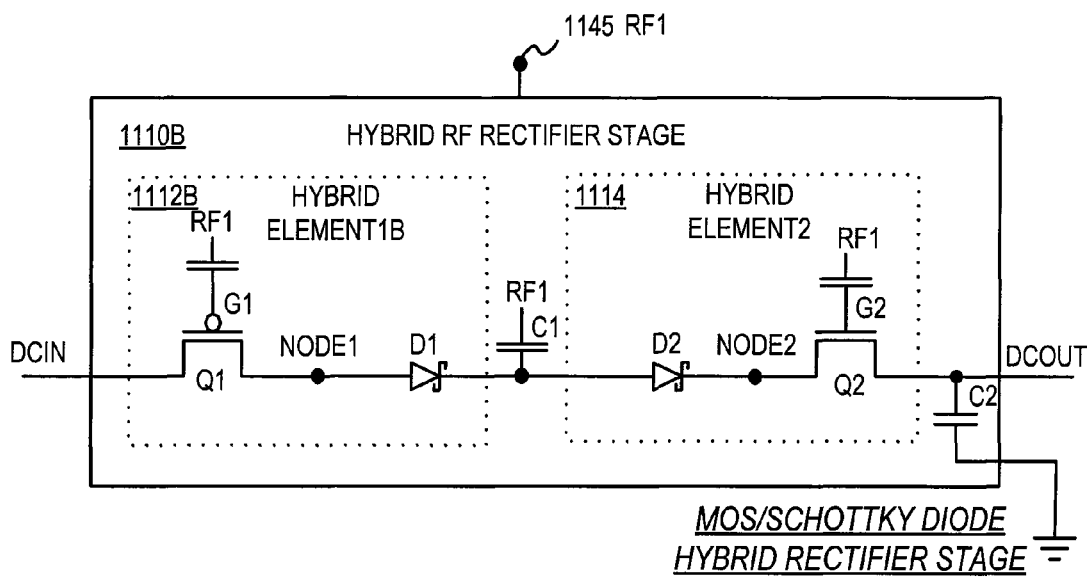
FIG. 11B is a schematic diagram of a hybrid RF Rectifier Stage using Schottky diodes according to an embodiment.
Figure 11C:
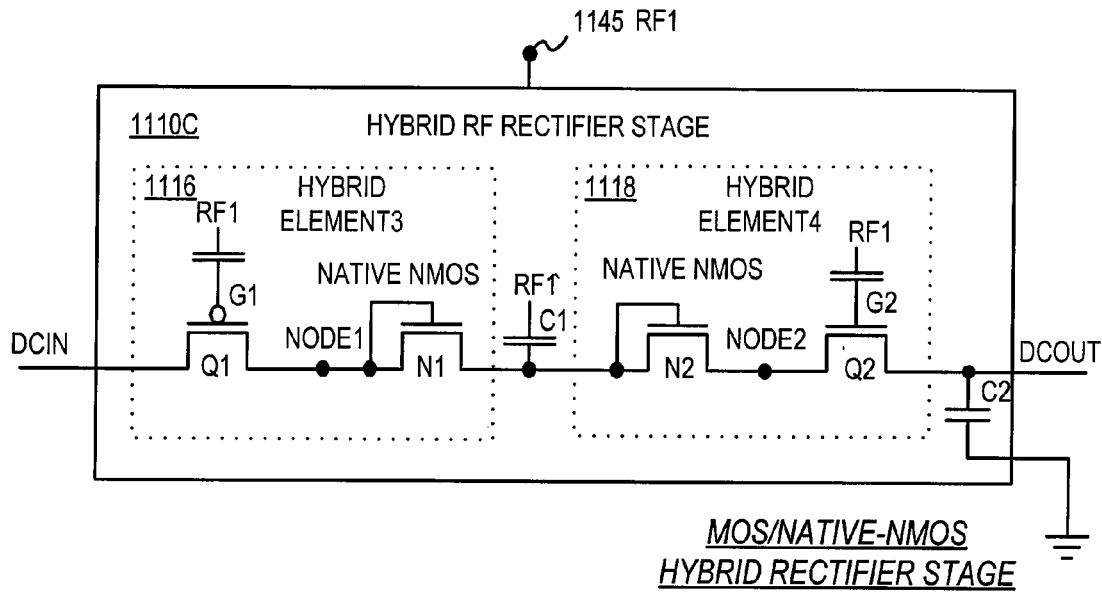
FIG. 11C is a schematic diagram of a hybrid RF Rectifier Stage using native-NMOS devices according to an embodiment.

FIG. 11C is a schematic diagram that illustrates Rectifier Stage 1110C according to an embodiment. Rectifier Stage 1110C includes Hybrid element3 1116 and Hybrid element4 1118. Hybrid element3 1116 and Hybrid element4 1118 are coupled serially to form rectifier Stage 1110C. Capacitor C2 couples an output terminal of Hybrid element4 1118 to ground.

Hybrid element3 1116 includes PMOS transistor Q1 and native NMOS diode N1. An anode of NMOS diode N1 is coupled to an output terminal of transistor Q1 to form intermediate node Node 1. Node 1 is not connected to any remaining components of its stage. Gate G1 of transistor Q1 and a cathode of native NMOS diode N1 are both coupled to antenna input node 1145, to receive RF1. Gate G1 may also be coupled to receive a DC bias voltage in addition to RF1, while the input terminal of transistor Q1, that is also an input terminal of rectifier stage 1110B, is coupled to receive a DC voltage.

Hybrid element4 1118 includes native NMOS diode N2 and NMOS Q2. An input terminal of transistor Q2 is coupled to a cathode of native NMOS diode N2 to form intermediate node Node2. Node2 is not connected to any remaining components of its stage. Gate G2 of transistor Q2 and the input terminal of native NMOS diode N2 are both coupled to antenna node 1145, to receive RF1. Gate G2 may also be coupled to receive a DC bias voltage in addition to RF1. An output terminal of transistor Q2 is the output terminal of rectifier stage 1110C.

Figure 11D:
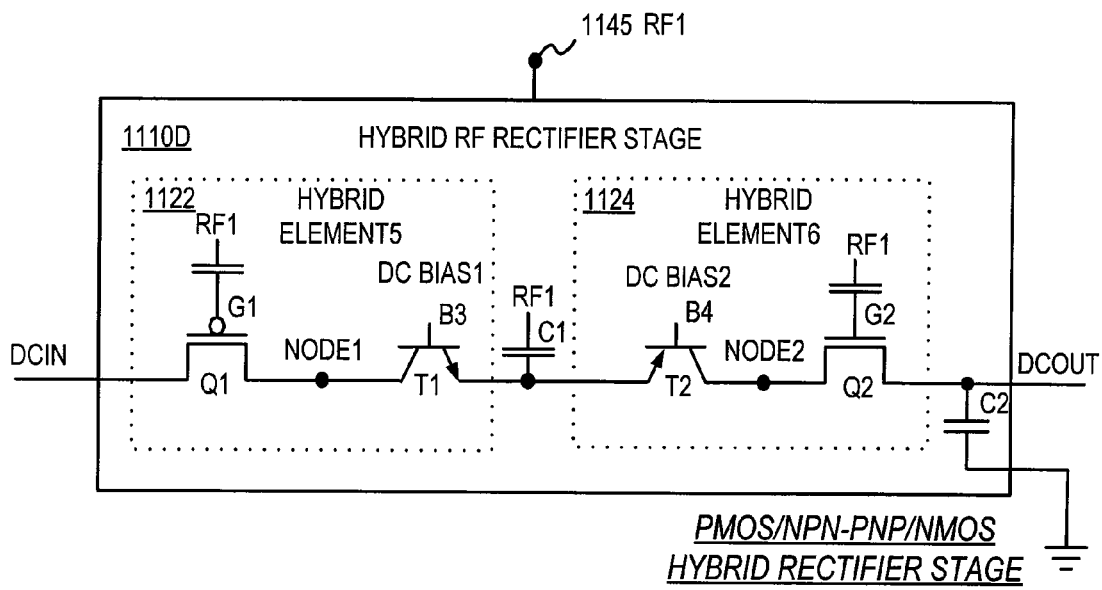
FIG. 11D is a schematic diagram of a hybrid RF Rectifier Stage using bipolar transistors according to an embodiment.
Figure 12A:
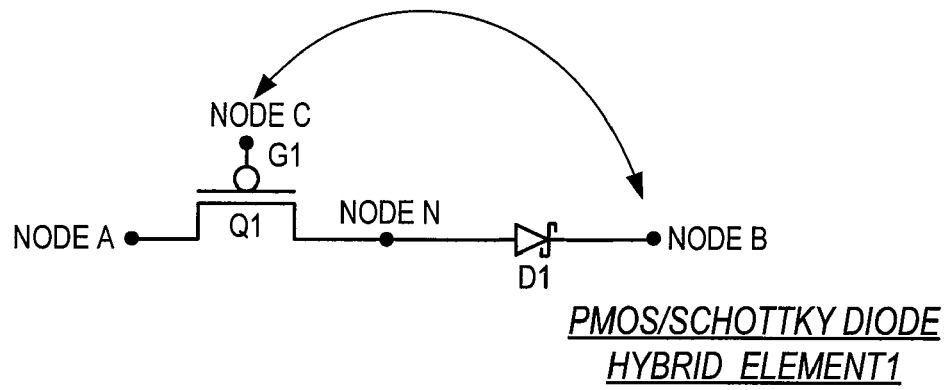
FIG. 12A is a schematic diagram of a PMOS-diode element of the hybrid RF Rectifier Stage according to embodiments.
Figure 12B:
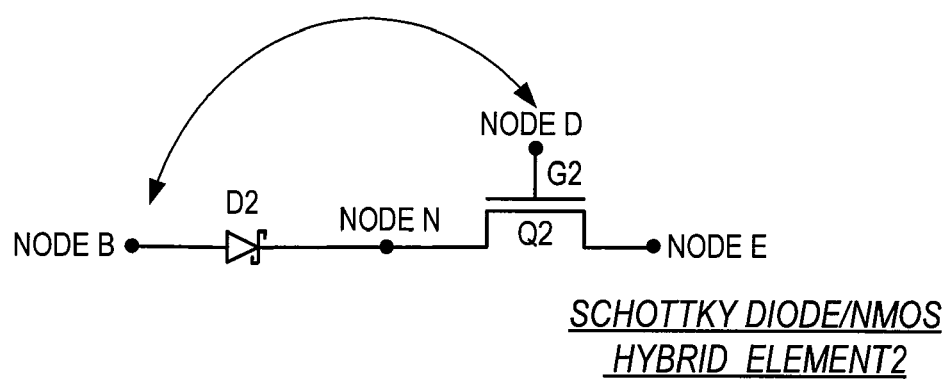
FIG. 12B is a schematic diagram of a second element of the hybrid RF Rectifier Stage according to embodiments.
Figure 12C:
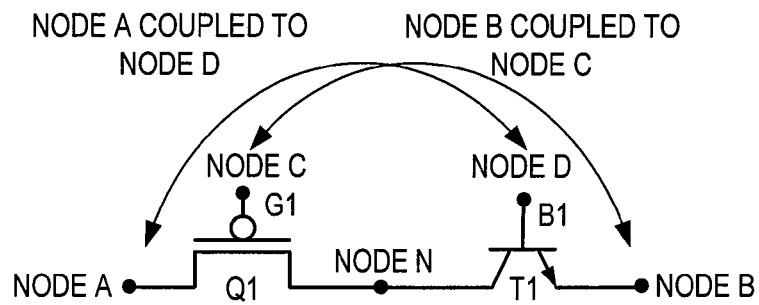
FIG. 12C is a schematic diagram of a PMOS-diode element of the hybrid RF Rectifier Stage according to embodiments.
Figure 12D:
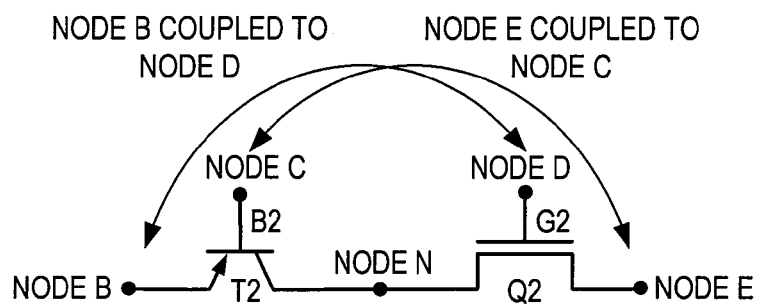
FIG. 12D is a schematic diagram of a second element of the hybrid RF Rectifier Stage according to embodiments.

FIGS. 11D, 12C, and 12D are schematic diagrams that illustrate Rectifier Stage 1110D according to an embodiment. Rectifier Stage 1110D includes Hybrid element5 1122 and Hybrid element6 1124. Hybrid element5 1122 and Hybrid element6 1124 are coupled serially to form rectifier Stage 1110D. Capacitor C2 couples an output terminal of Hybrid element6 1124 to ground.

Hybrid element5 1022 includes PMOS transistor Q1 and PNP transistor T1. A collector of transistor T1 is coupled to an output terminal of transistor Q1 to form intermediate node Node1. Node 1 is not connected to any remaining components of its stage. Gate G1 of transistor Q1 and a base of transistor T1 are both coupled to an antenna input node, to receive RF1. Gate G1 may also be coupled to receive a DC bias voltage in addition to RF1. A base of transistor T1 is coupled to receive DC bias voltage DC BIAS1, while the input terminal of transistor Q1 is coupled to receive a DC voltage.

Hybrid element6 1024 includes NPN transistor T2 and NMOS transistor Q2. An input terminal of transistor Q2 is coupled to a collector of transistor T2 to form intermediate node Node2. Node2 is not connected to any remaining components of its stage. A base of transistor T2 is coupled to receive DC bias voltage DC BIAS2. DC BIAS1 could be the same as, or different from, DC BIAS2. Gate G2 of NMOS transistor Q2 and an emitter of transistor T2 are both coupled to an antenna node to receive RF 1. Gate G2 may also be coupled to receive a DC bias voltage in addition to RF1. An output terminal of transistor Q2 is the output terminal of rectifier stage 1119D.

Figure 11E:
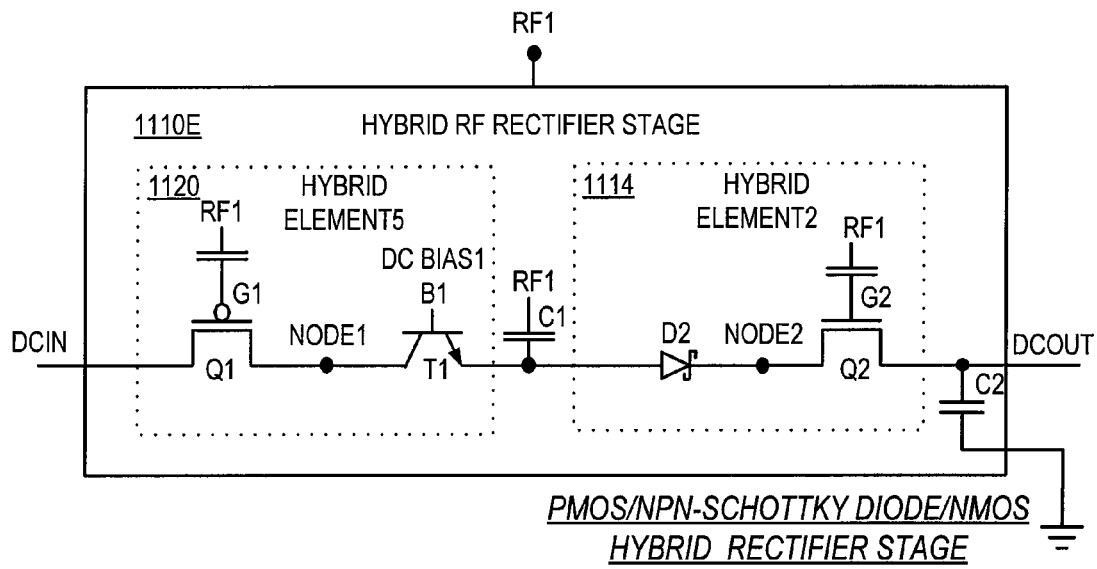
FIG. 11E is a schematic diagram of a hybrid RF Rectifier Stage using a NPN transistor and a Schottky diode according to an embodiment.

FIG. 11E is a schematic diagram that illustrates Rectifier Stage 1110E according to an embodiment. Rectifier Stage 1110E includes Hybrid element5 1122 and Hybrid element2 1114. Hybrid element5 1122 and Hybrid element2 1114 are serially coupled to form rectifier Stage 1110E. Capacitor C2 couples an output terminal of Hybrid element2 1114 to ground.

Figure 11F:
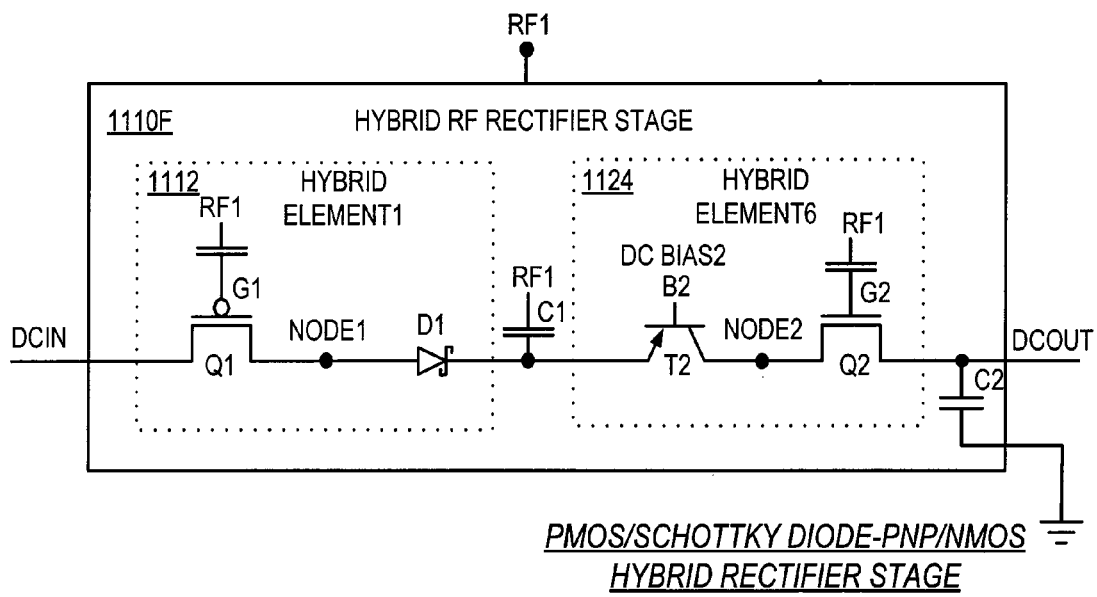
FIG. 11F is a schematic diagram of a hybrid RF Rectifier Stage using a Schottky diode and a PNP transistor according to an embodiment.

FIG. 11F is a schematic diagram that illustrates Rectifier Stage 1110F according to an embodiment. Rectifier Stage 1110F includes Hybrid element1 1112 and Hybrid element6 1124. Hybrid element1 1112 and Hybrid element6 1124 are coupled serially to form rectifier Stage 1124. Capacitor C2 couples an output terminal of Hybrid element6 1114 to ground.

It should be noted a Hybrid Rectifier Stage may be formed by coupling Hybrid element1 to Hybrid element4 and Hybrid element3 to Hybrid element2 respectively.

Figure 13:
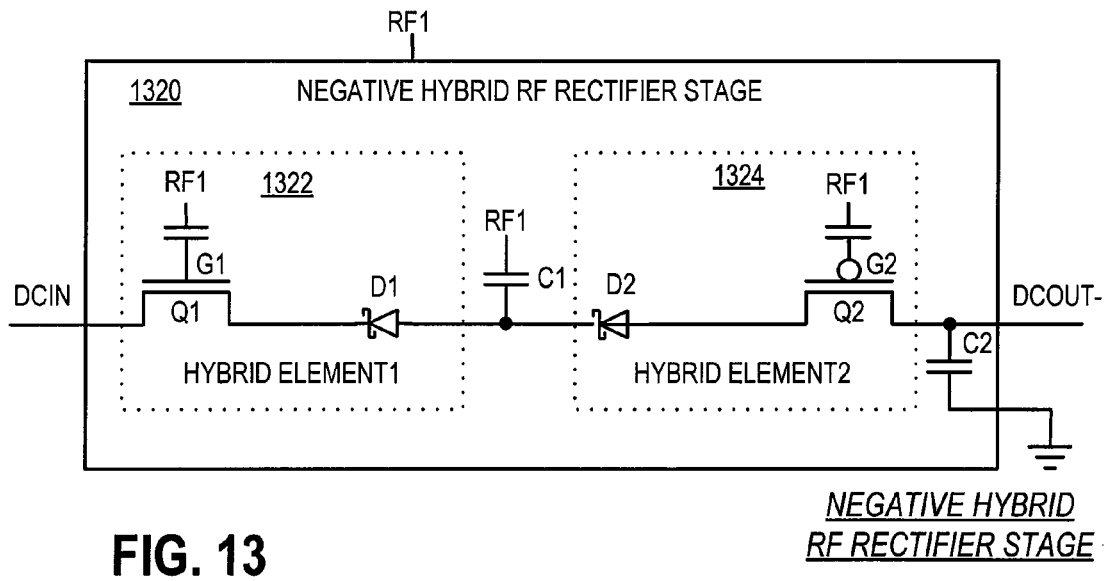
FIG. 13 is a schematic diagram of a Negative hybrid RF Rectifier Stage according to an embodiment.

FIG. 13 is a schematic diagram of Negative Hybrid RF Rectifier Stage 1320 according to an embodiment. Operation principles of Negative Hybrid Rectifier Stage 1320 and of Hybrid Rectifier Stage 1110B of FIG. 11B are fundamentally are the same. A notable difference is in regards to polarities of the output voltages they provide. Rectifier Stage 1320 provides a DC output voltage at output terminal DCOUT– that is lower than the DC input voltage at input terminal DCIN. Circuit topology of Rectifier Stage 1320 and Rectifier Stage 1110B are substantially identical. They differ from each other in an arrangement of transistor polarity. In Rectifier Stage 1010, Q1 is a PMOS transistor, and Q2 is a NMOS transistor, however the corresponding transistors in Rectifier Stage 1020 have the opposite polarity.

Figure 14:
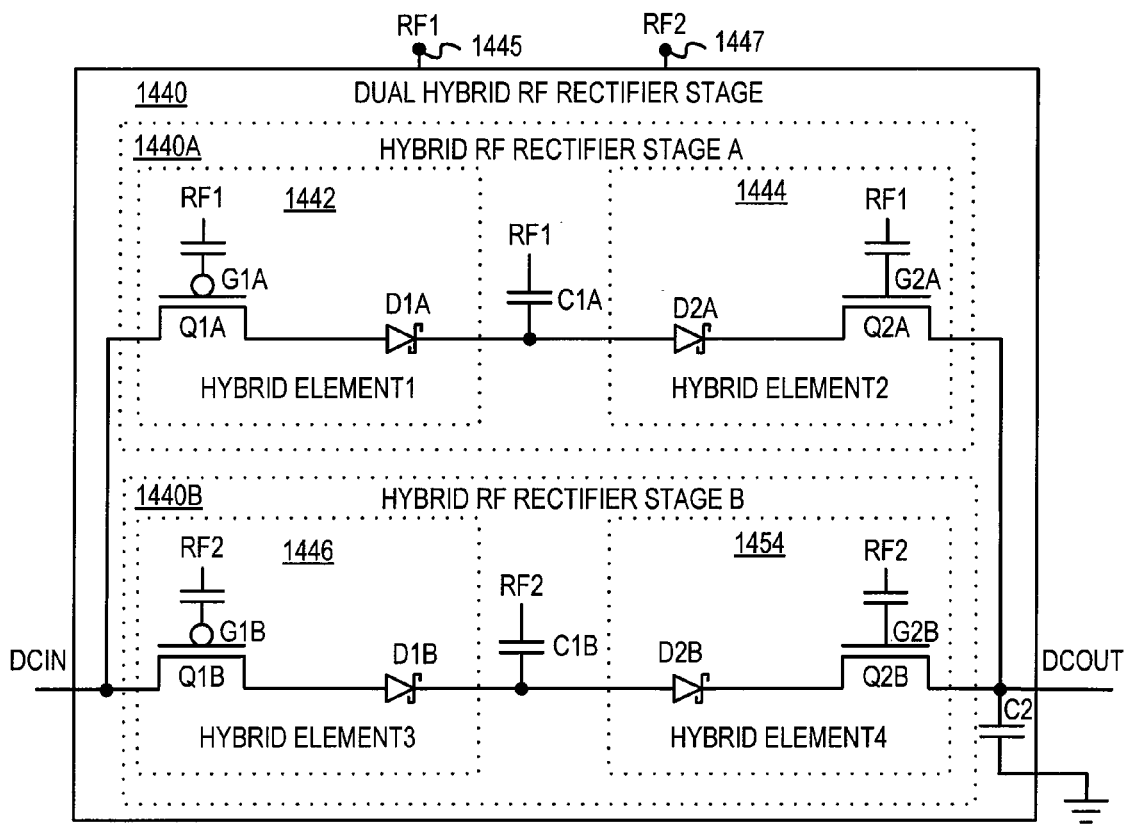
FIG. 14 is a schematic diagram of a Dual Antenna hybrid RF Rectifier Stage according to an embodiment.

FIG. 14 is a schematic diagram of Dual Antenna Hybrid RF Rectifier Stage 1440 according to an embodiment. Dual Antenna Rectifier Stage 1440 includes two parallel-coupled rectifier stages, Rectifier Stage 1440A, and Rectifier Stage 1440B. Rectifier Stages 1440A and 1440B are substantially identical with Rectifier Stage 1110B of FIG. 11A. Rectifier Stage 1440A is coupled to antenna input node 1445 to receive RF signal RF1, while Rectifier Stage 1440B is coupled to antenna input node 1447 to receive RF signal RF2. Rectifier Stages 1440A and 1440B share capacitor C2.

Figure 15:
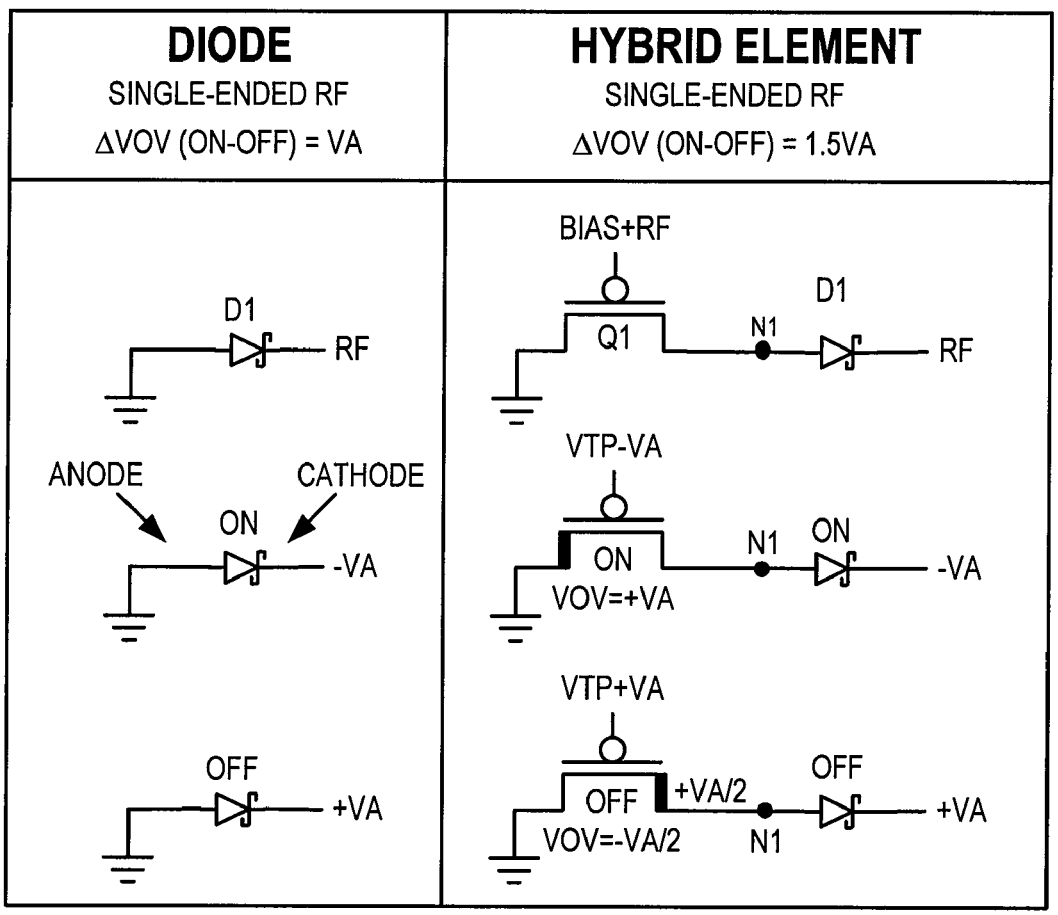
FIG. 15 is a table showing notations that are used for analysis of rectifier circuits of FIGS. 11 B-F.

FIG. 15 is table 1500 that shows notations that are used for analysis of rectifier circuits 1110B of FIGS. 11B. The following text describes the meaning of these notations, without any specific order. VTN represents a threshold voltage of an NMOS transistor. VTP represents a threshold voltage of a PMOS transistor. VGS represents the difference between the gate voltage and the source voltage of a transistor. VOV represents a value of an overdrive voltage that exists between a gate and a source of a transistor. For an NMOS transistor, VOV is equal to VGS–VTN, and for a PMOS transistor, VOV is equal to VTP–VGS. A transistor with a higher VOV will have stronger conduction than an equivalent transistor with a lower VOV. This analysis defines a transistor with a positive VOV to be ON and a transistor with a negative VOV or a VOV of zero to be OFF. OFF transistors may have some small amount of conduction depending on their VOV. VA represents the amplitude of an RF signal. –VA represents a negative peak value of the RF signal. +VA represents a positive peak value of the RF signal. Bold line in a transistor symbol represents the source of a transistor. By definition, the end of a channel of an NMOS transistor having the lower potential is referred to as the source, and the end of a channel of a PMOS transistor having the higher potential is referred to as the source. Present analysis assumes that charge flows from a high potential node toward a low potential node, consequently charge flows from drain to source for an NMOS transistor and from source to drain for a PMOS transistor. The term "charge phase" used in the analysis refers to the phase of the RF signal in which charge is added to the capacitor driven by the RF signal. The term "discharge phase" refers to the phase of the RF signal in which charge is transferred from the capacitor driven by the RF signal to the DC output of the stage.

Figure 16A:
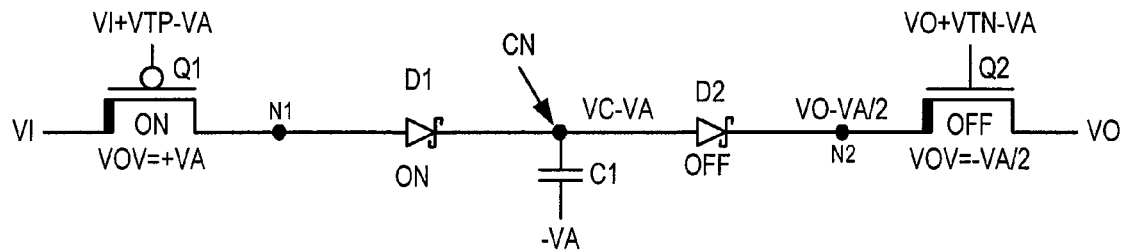
FIG. 16A is an annotated schematic diagram for analyzing switching of the hybrid RF rectifier during charge phase.

FIG. 16A is annotated schematic diagram 1600A that assists in analyzing a Hybrid rectifier stage of FIG. 11B during a charge phase. During the charge phase, capacitor C1 is driven by the negative peak of the RF input by a voltage that is valued at –VA, and a gate of transistor Q1 receives a control voltage that is valued at VI+VTP–VA, which creates an overdrive voltage VOV, valued at +VA. Under these conditions-transistor Q1 is ON. Diode D1 is forward biased and it is on ON, and charge is transferred from V1 through Q1, and through diode D1 to capacitor C1. The voltage on node CN is approximately VI minus the ON voltage drops of transistor Q1 and diode D1. The voltage drop across transistor Q1 can be made small compared to the drop across diode D1, because the MOS device has a large overdrive voltage. At the same time a gate of transistor Q2 receives a control voltage that is valued at VO+VTN–VA. This turns Q2 OFF strongly.

Figure 16B:
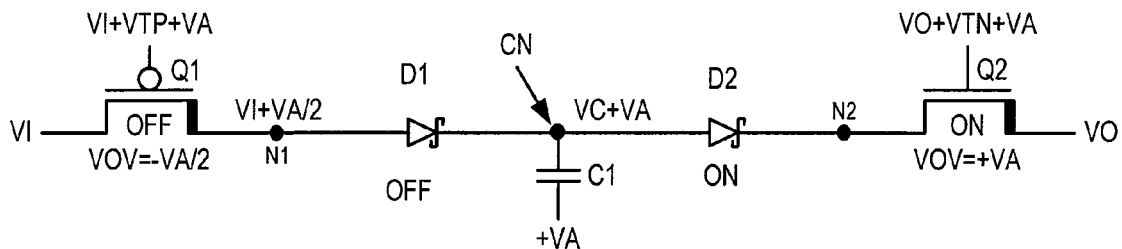
FIG. 16B is an annotated schematic diagram for analyzing switching of the hybrid RF rectifier during discharge phase.

FIG. 16B is annotated schematic diagram 1600B that assists in analyzing a Hybrid rectifier stage of FIG. 11B during a discharge phase. During the discharge phase, capacitor C1 is driven by the positive peak of the RF input with a voltage that is valued at +VA, and a gate of transistor Q1 receives a control voltage that is valued at VI+VTP+VA. This overdrive on the gate of PMOS Q1 turns it OFF. The gate of transistor Q2 receives a control voltage that is valued at VO+VTN+VA, and has an overdrive voltage VOV that is valued at +VA. Under these conditions, transistor Q2 is ON.

For the Hybrid rectifier stage analyzed in FIGS. 16A and 16B, the OFF overdrive voltage is –VA/2. The OFF overdrive voltage for Q2 is also VA/2. The overdrive in the OFF state forces this transistor into very low conduction.

Figure 17A:
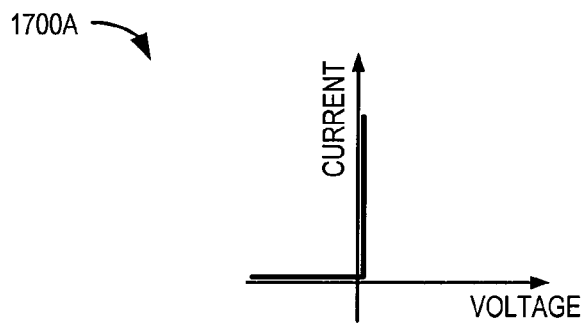
FIG. 17A is a Current Voltage (I/V) diagram of an ideal rectifier element.

FIGS. 17A through 17D are Current Voltage (I/V) diagrams of different rectifier elements generally used for low voltage rectifications. The horizontal axis voltage represents the difference between the voltages at the input and the output of the rectifier element. FIG. 17A shows the I/V diagram of an ideal rectifier element. The ideal rectifier element has no forward drop or threshold and there is no current conductance in a reverse direction. No practical device possesses such characteristics; however, different device technologies and design techniques are used to approximate such a behavior.

Figure 17B:
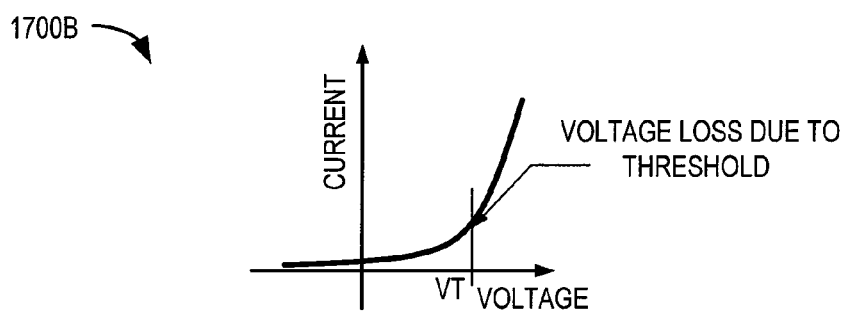
FIG. 17B is a Current Voltage (I/V) diagram of a diode-connected transistor rectifier element.

FIG. 17B is the I/V diagram of a diode-connected transistor rectifier element. The diode-connected transistor rectifier element suffers from significant voltage loss due to threshold voltage. This is also true for other rectifier junctions, such as, bipolar diodes and bipolar transistors.

Figure 17C:
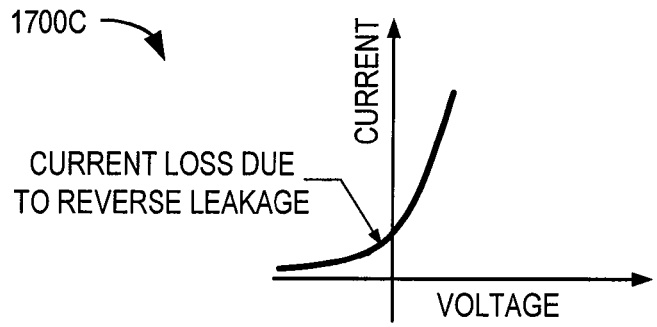
FIG. 17C is a Current Voltage (I/V) diagram of a biased FET transistor rectifier element.

FIG. 17C is the I/V diagram of a biased FET transistor rectifier element. FET transistor rectifier elements have lower voltage losses due to threshold voltage; however, they still exhibit significant losses due to reverse leakage. The same tradeoff exists for other rectifying elements such as bipolar junctions. Process adjustments can reduce the forward drop of a diode junction, such as in a Schottky diode. In addition, the area of the junctions can be increased to decrease the voltage drop at the cost of undesired parasitic elements, such as capacitance. However, in each case the reverse condition will increase and limit the efficiency of the rectifier.

Figure 17D:
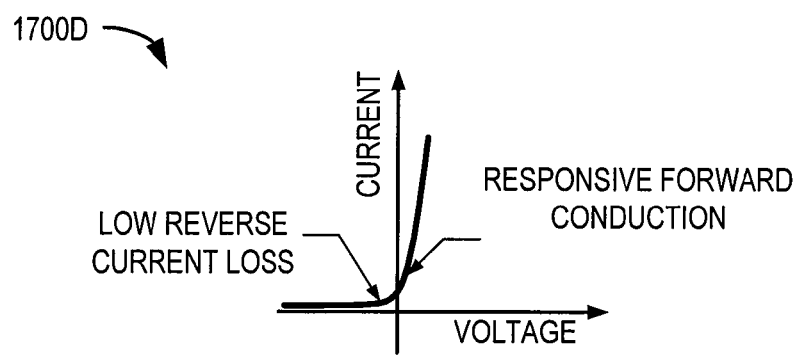
FIG. 17D is a Current Voltage (I/V) diagram of a hybrid rectifier element according to embodiments.

FIG. 17D is the I/V diagram of a hybrid rectifier element according to embodiments. The I/V diagram looks more like the ideal case, because the gate voltage of the MOS transistor Q1 changes with the input voltage. The forward conduction characteristic can be determined by devices D1 and D2 and made low, while the reverse conduction can be limited by MOS devices Q1 and Q2. In the prior art "Double-switch CMOS rectifier" D1 and D2 are implemented as MOS-FET rectifiers with bias, and the equivalents of transistor Q1 and transistor Q2 control the reverse leakage. In this invention the preferred embodiment of D1 and D2 are Schottky diodes, in which the barrier voltage, the area and parasitic components of the junction are optimized for good forward conduction. However, as discussed earlier many other devices besides a Schottky junction can be used for low forward voltage drop such as biased bi-polar transistors or non-silicon based devices.

Variations are also possible in the above. For example, polarities could be interchanged in accordance with embodiments. This would be performed as discerned by a person skilled in the art, in view of the present description. For example, PFETs could be substituted by NFETs and vice versa, plus any PNP bipolar transistors would be interchanged with NPN bipolar transistors and vice versa, the sequence of elements may be rearranged, and so on.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions, and/or properties disclosed herein. The following claims define certain combinations and subcombinations, which are regarded as novel and non-obvious. Additional claims for other combinations and subcombinations of features, functions, elements, and/or properties may be presented in this or a related document.

The invention claimed is:

1. A power rectifier for a Radio Frequency Identification tag, comprising:
    an antenna input node configured to receive wirelessly an alternating signal; and
    a plurality of serially coupled stages, at least one of the stages coupled to the antenna input node, and including a first Hybrid element and a second Hybrid element,
    the first Hybrid element including:
        a first transistor having an input terminal, an output terminal and a first gate, and
        a first device having an input terminal and an output terminal, the second Hybrid element including:
        a second transistor having an input terminal, an output terminal and a second gate; and
        a second device having an input terminal and an output terminal;
    in which the input terminal of the first device is connected to the output terminal of the first transistor to form a first intermediate node that is not connected to any other components, and
    the first gate is coupled to the antenna input node,
    the first device is not biased by the alternating signal;
    the output terminal of the second device is connected to the input terminal of the second transistor to form a second intermediate node that is not connected to any other components,
    the second gate is coupled to the antenna input node, and
    the second device is one of a PNP transistor, an NPN transistor, a Schottky diode, and a diode-connected native NMOS transistor.

2. The rectifier of claim 1, in which
    the first gate is further coupled to the output terminal of the first device.

3. The rectifier of claim 1, in which
    the first transistor is a PMOS.
4. The rectifier of claim 1, in which
    the first device is a Schottky diode.
5. The rectifier of claim 1, in which
    the first device is a native NMOS transistor configured as a diode.
6. The rectifier of claim 1, in which
    the input terminal of the first transistor is connected to receive a DC voltage.
7. The rectifier of claim 1, in which
    the first device is a NPN transistor.
8. The rectifier of claim 7, in which
    the input terminal of the NPN transistor is its collector.
9. The rectifier of claim 7, in which
    the first device also includes a base terminal that is coupled to receive a first DC bias voltage.
10. The rectifier of claim 1, in which
    the first device is a PNP transistor.
11. The rectifier of claim 1, in which
    the second transistor is a NMOS.
12. The rectifier of claim 1, in which
    the second gate is coupled to the input terminal of the second device.
13. The rectifier of claim 1, in which
    the input terminal of the PNP transistor is its emitter.
14. The rectifier of claim 1, in which
    if the second device is a PNP transistor, the second device also includes a base terminal that is coupled to receive a second DC bias voltage.
15. A power rectifier for a Radio Frequency Identification tag, comprising:
    a first antenna input node configured to receive wirelessly a first alternating signal;
    a second antenna input node configured to receive wirelessly a second alternating signal; and
    a plurality of serially coupled dual stages, at least one of the dual stages coupled to both the first and second antenna input nodes, and including a first dual Hybrid element that includes:
    a first transistor having an input terminal, an output terminal, and a first gate, and
    a first device having an input terminal and an output terminal,
    in which the output terminal of the first transistor is connected to the input terminal of the first device to form a first intermediate node that is not connected to any other components, and
    a second device having an input terminal and an output terminal, and
    a second transistor having an input terminal, an output terminal, and a second gate,
    in which the input terminal of the second transistor is connected to the output terminal of the second device to form a second intermediate node that is not connected to any other components,
    the first gate is coupled to the first antenna input node, while the first device is not biased by an alternating signal,
    the second gate is coupled to the second antenna input node, while the second device is not biased by an alternating signal; and
    the first and second devices are one of Schottky diodes, diode-connected native NMOS transistors, PNP transistors, and NPN transistors.

16. The rectifier of claim 15, in which the first gate is further coupled to the output terminal of the first device to receive a DC bias voltage.

17. The rectifier of claim 15, in which the second gate is coupled to the input terminal of the second device to receive a DC bias voltage.

18. The rectifier of claim 15, in which the first transistor is a PMOS.

19. The rectifier of claim 15, in which the second transistor is a NMOS.

20. The rectifier of claim 1, wherein the output terminal of the first device is coupled to the input terminal of the second device.

21. The rectifier of claim 2, wherein the first gate is coupled to the output terminal of the first device via a capacitor.

22. The rectifier of claim 12, wherein the second gate is coupled to the input terminal of the second device via a capacitor.

23. The rectifier of claim 15, wherein the output terminal of the first device is coupled to the input terminal of the second device.

* * * * *